D. FLOOD AND A. PEARSON.
HOOK.
APPLICATION FILED MAY 4, 1918.
1,305,892.
Patented June 3, 1919.
Fig. 1,
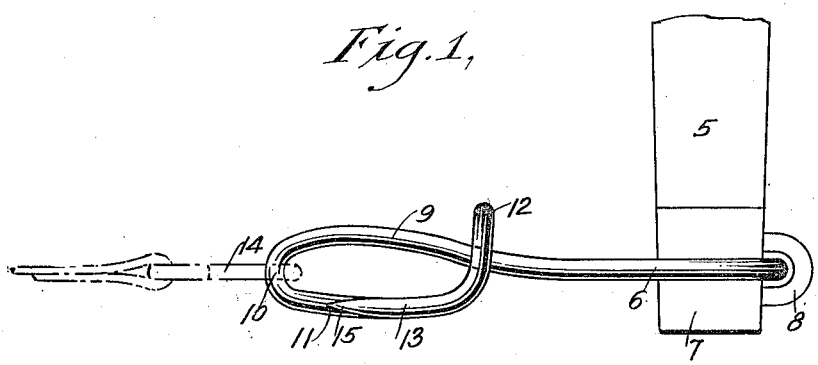
Fig. 2,
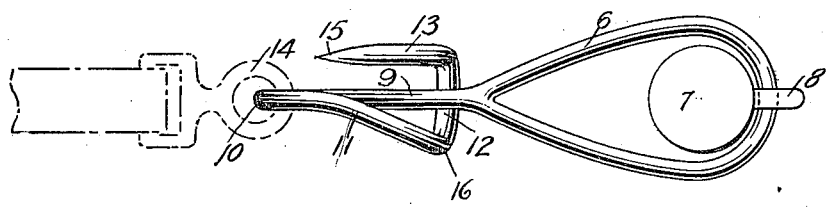
Fig. 3.
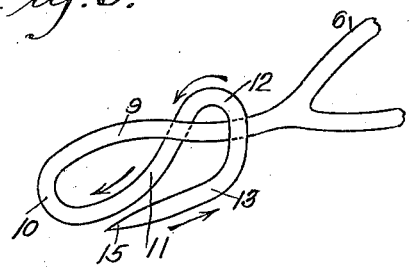
WITNESSES
Edw. Thorpe
L. B. Marshall
INVENTORS
David Flood
Anton Pearson
BY
ATTORNEYS

UNITED STATES PATENT OFFICE.

DAVID FLOOD AND ANTON PEARSON, OF LINDSBORG, KANSAS.

HOOK.

1,305,892.  Specification of Letters Patent.  Patented June 3, 1919.

Application filed May 4, 1918. Serial No. 232,637.

*To all whom it may concern:*

Be it known that we, DAVID FLOOD and ANTON PEARSON, both subjects of the King of Sweden, and residents of Lindsborg, in the county of McPherson and State of Kansas, have invented a new and Improved Hook, of which the following is a full, clear, and exact description.

Our invention has for its object to provide a hook which may be used on swingletrees and which is simple and cheap in construction, to which a trace may be quickly secured without danger of the trace becoming freed from the hook by the movement of the horse.

Additional objects of the invention will appear in the following specification in which the preferred form of our invention is described.

In the drawings similar reference characters refer to similar parts in all the views, in which—

Figure 1 is a plan view of the invention;

Fig. 2 is a side view of Fig. 1; and

Fig. 3 is a fragmentary perspective view illustrating the construction of the hook.

By referring to the drawings, it will be seen that our improved hook is secured to a swingletree 5, the hook having a loop 6 which extends around an end 7 of the swingletree and through an eye 8 which is secured to the said swingletree end 7. From the loop 6, the swingletree hook extends forwardly at 9, then laterally and outwardly at 10, then rearwardly at 11, then laterally in the opposite direction at 16, under the forwardly extending portion 9, up and over the said forwardly extending portion at 12, and then forwardly at 13 substantially in the vertical plane of the rearwardly extending portion 11.

With this construction, the trace hook shown by the dotted lines at 14, may be disposed over the terminal 15 of the forwardly extending portion 13 of the hook, thence laterally and downwardly over the portion 12 and forwardly over the rearwardly extending portion 11 of the hook to the laterally extending portion 10.

It will be seen that while the hook is very cheap to construct, and while it is possible to attach the trace hook 14 to the hook without trouble, nevertheless, when the hook is in the position indicated by the dotted lines in Figs. 1 and 2 of the drawings, there will be no danger of the trace becoming freed from the hook until the teamster desires.

Having thus described our invention, we claim as new and desire to secure by Letters Patent;

1. A hook extending forwardly, laterally in one direction, rearwardly, laterally in the other direction beyond the forwardly extending portion, half around the said forwardly extending portion, laterally in the said first direction, and forwardly above and in the vertical plane of the rearwardly-extending portion.

2. A hook extending forwardly, laterally in one direction, rearwardly, laterally in the opposite direction under the forwardly extending portion, up and over the said forwardly extending portion, and in the said first lateral direction and forwardly.

3. A hook extending forwardly, laterally in one direction, rearwardly, laterally in the other direction beyond the forwardly extending portion, half around the said forwardly extending portion, and laterally in the said first direction and forwardly substantially in the vertical plane of the rearwardly extending portion.

DAVID FLOOD.
ANTON PEARSON.

Copies of this patent may be obtained for five cents each, by addressing the "Commissioner of Patents, Washington, D. C."